(12) United States Patent
Metz, Jr. et al.

(10) Patent No.: US 8,352,309 B2
(45) Date of Patent: Jan. 8, 2013

(54) DEFINING A SERVICEABILITY ASSESSMENT MEASURE

(75) Inventors: Walter C. Metz, Jr., Raleigh, NC (US); Hoyt C. Simmons, Apex, NC (US); Susan Elyce Swanson, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 12/194,075

(22) Filed: Aug. 19, 2008

(65) Prior Publication Data

US 2010/0047754 A1 Feb. 25, 2010

(51) Int. Cl.
*G06Q 10/00* (2012.01)
(52) U.S. Cl. .................................................. 705/7.32
(58) Field of Classification Search ................... 705/7.32
See application file for complete search history.

(56) References Cited

U.S. PATENT DOCUMENTS

| | | | |
|---|---|---|---|
| 6,765,593 B2 * | 7/2004 | Simmons | 715/763 |
| 2002/0044296 A1 * | 4/2002 | Skaanning | 358/1.14 |
| 2004/0091916 A1 * | 5/2004 | Vandezande | 435/6 |
| 2007/0043602 A1 | 2/2007 | Ettl et al. | |
| 2007/0219838 A1 * | 9/2007 | Appleman et al. | 705/8 |

OTHER PUBLICATIONS

Craig W. Kirkwood, "Decision Tree Primer" (2002), available at http://www.public.asu.edu/~kirkwood/DAStuff/decisiontress/index.html.*
Michael A. Trick, "Decision Trees" (1998), available at http://mat.gsia.cmu.edu/classes/QUANT/NOTES/chap9/node4.html.*

* cited by examiner

*Primary Examiner* — Andre Boyce
*Assistant Examiner* — Tiphany Dickerson
(74) *Attorney, Agent, or Firm* — Rabindranath Dutta; Raynes, Davda & Victor LLP

(57) ABSTRACT

A plurality of questions are displayed. Responses to the plurality of questions are received, wherein a response to a question included in the plurality of questions includes an indication of a likelihood of occurrence of an answer to the question. A value for a quality measure is determined, based on the responses to the plurality of questions.

12 Claims, 9 Drawing Sheets

DEFINING A SERVICEABILITY ASSESSMENT MEASURE

BACKGROUND

1. Field

The disclosure relates to a method, a system, and an article of manufacture for defining a serviceability assessment measure.

2. Background

When systems, such as computers, appliances, machinery, software, etc., are provided to a customer, a possibility exists that one or more component parts of such systems may fail. The ease with which the system can be serviced or maintained in response to such a failure may be referred to as the serviceability of the system. Measures have been developed to compute the serviceability of various systems, wherein the serviceability measures may attempt to compute a cost measure for the serviceability of the system. The cost measure may include the amount of time and resources that have to be spent to service or maintain the system or the monetary value corresponding to the amount of time and resources that may be required to service or maintain the system.

Certain serviceability assessment processes may help in reducing the warranty cost of products with replaceable parts, wherein products with replacement parts include computers, appliances, machinery, etc. Product warranty costs may be reduced by making parts more reliable and by decreasing the service time required for problem determination and replacement of failed parts. Significant reductions can be achieved by designing products with customer replaceable units.

Determining a set of criteria for evaluating the serviceability of a system may be useful for determining the cost measure corresponding to the ease of serviceability of the system. Customers usually prefer to use a system whose serviceability is easier in comparison to systems whose serviceability is more difficult.

SUMMARY OF THE PREFERRED EMBODIMENTS

Provided are a method, a system, an article of manufacture, and a method for deploying computing infrastructure, wherein a plurality of questions are displayed. Responses to the plurality of questions are received, wherein a response to a question included in the plurality of questions includes an indication of a likelihood of occurrence of an answer to the question. A value for a quality measure is determined, based on the responses to the plurality of questions.

In additional embodiments, the plurality of questions are configured to evaluate a serviceability of a product, wherein the quality measure is a serviceability measure for resolving a problem with the product, wherein the question is a percent question that requests the indication of the likelihood of the occurrence of the answer. A serviceability assessment program included in a computational device performs the displaying, the receiving, and the determining. The responses to the plurality of questions are provided by a product evaluator into a display interface generated by the serviceability assessment program. A hierarchy of questions includes the plurality of questions, and selected responses to selected questions in the hierarchy of questions are used by the serviceability assessment program to determine the value for the serviceability measure.

In certain additional embodiments, a service time, ST, denotes the serviceability measure, wherein the serviceability assessment program determines the value of the service time, ST, by calculating the expression $ST \leftarrow ST + (Qtime * Qfreq)$, wherein Qtime denotes a question time value for a selected question, and wherein Qfreq denotes a fraction of time characterizing the frequency of the selected question.

In further embodiments, paths indicative of likelihoods of answers in the hierarchy of questions are traversed, wherein questions in the hierarchy of questions are displayed by the serviceability assessment program in a categorized order.

In yet further embodiments, answers to selected questions of the plurality of questions lead to other questions, wherein the other questions are subquestions. The serviceability assessment program determines the value of the quality measure, based on answers to the plurality of questions and the subquestions, wherein if $Qfreq'$ denotes a subquestion frequency, $Qfreq$ denotes a question frequency, and $Qfrac$ denotes a question fraction then: a frequency of true subquestions is determined by calculating an expression $Qfreq' \leftarrow Qfreq * Qfrac$; and, a frequency of false subquestions is determined by calculating an expression $Qfreq' \leftarrow Qfreq * (1 - Qfrac)$.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
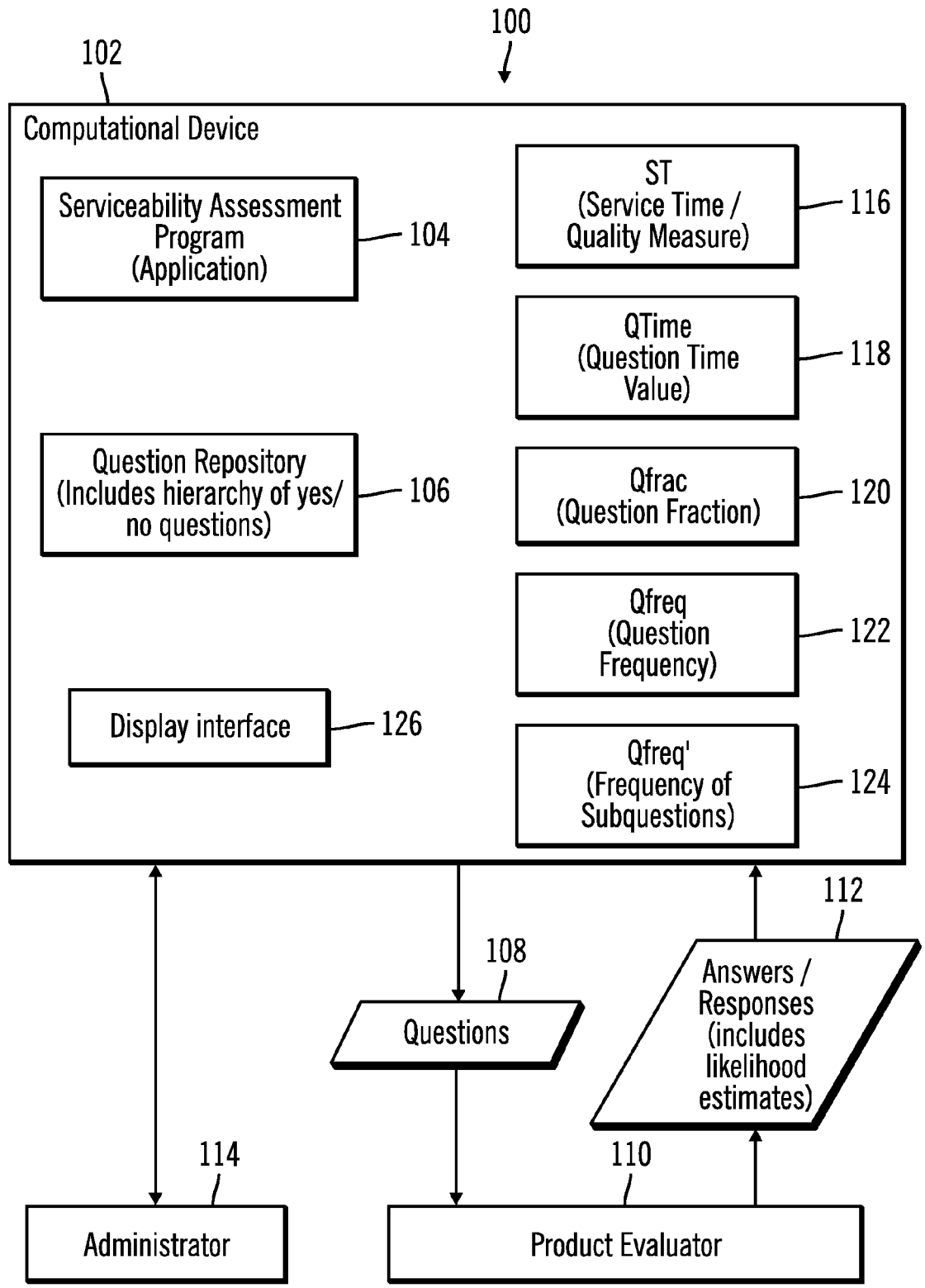
FIG. 1 shows a block diagram of a computing environment in which a computational device that includes a serviceability assessment program is shown, in accordance with certain embodiments.

FIG. 1 shows a block diagram of a computing environment 100 in which a computational device 102 that includes a serviceability assessment program 104 is shown, in accordance with certain embodiments.

The computational device 102 is any suitable computational device, such as, a mainframe computer, a midrange computer, a personal computer, a server computer, a client computer, a mobile computer, a telephony device, etc. The serviceability assessment program 104 is an application that may be implemented in software, hardware, firmware, or any combination thereof. In certain embodiments, the serviceability assessment program 104 may determine at least the following measures for serviceability of a product:

(a) Service times for problem determination;
(b) The percentage of service incidents that should be diagnosed by each possible problem determination (PD) procedure (for example: "automatic PD", "customer PD", "remote support PD", or "onsite PD"); and
(c) The percentage of service incidents that can be resolved by shipping the customer a part that is a customer replaceable unit (CRU).

In addition to the serviceability assessment program 104, the computational device 102 includes a question repository 106 that may be used by the serviceability assessment program 104 to present questions 108 to a product evaluator 110, wherein the questions 108 may be for determining how to resolve a problem associated with a product and to compute serviceability measures associated with the resolution of the problem. The product evaluator 110 may send answers 112 to the questions sent by the serviceability program 104.

In certain embodiments, an administrator 114 may have configured the serviceability assessment program 104 and the question repository 106, such that the serviceability assessment program 104 is able to send the questions 108 and analyze the received answers 112 for resolving problems associated with a product and compute serviceability measures associated with the resolution of the problem. In the course of evaluating the serviceability of a product by analyzing the effort in resolving problems associated with a product, the serviceability assessment program 104 may configure various exemplary data structures (e.g., variables), including the exemplary data structures shown as ST 116, Qtime 118, Qfrac 120, Qfreq 122, Qfreq' 124 in FIG. 1. The use of these exemplary data structures 116, 118, 120, 122, 124 in certain embodiments will be discussed later in the disclosure.

In certain embodiments, the responses 112, i.e., answers, to the plurality of questions 108 are provided by the product evaluator 110 into a display interface 126 generated by the serviceability assessment program 104, wherein the display interface 126 is also used by the serviceability assessment program 104 to display the questions 108 to the product evaluator 110. A hierarchy of questions may include the questions 108, and selected responses to selected questions in the hierarchy of questions are used by the serviceability assessment program 104 to determine the value for the serviceability measure provided by the service time, ST, 116. The serviceability measure provided by the service time, ST, 116 may be an exemplary quality measure.

Figure 2:
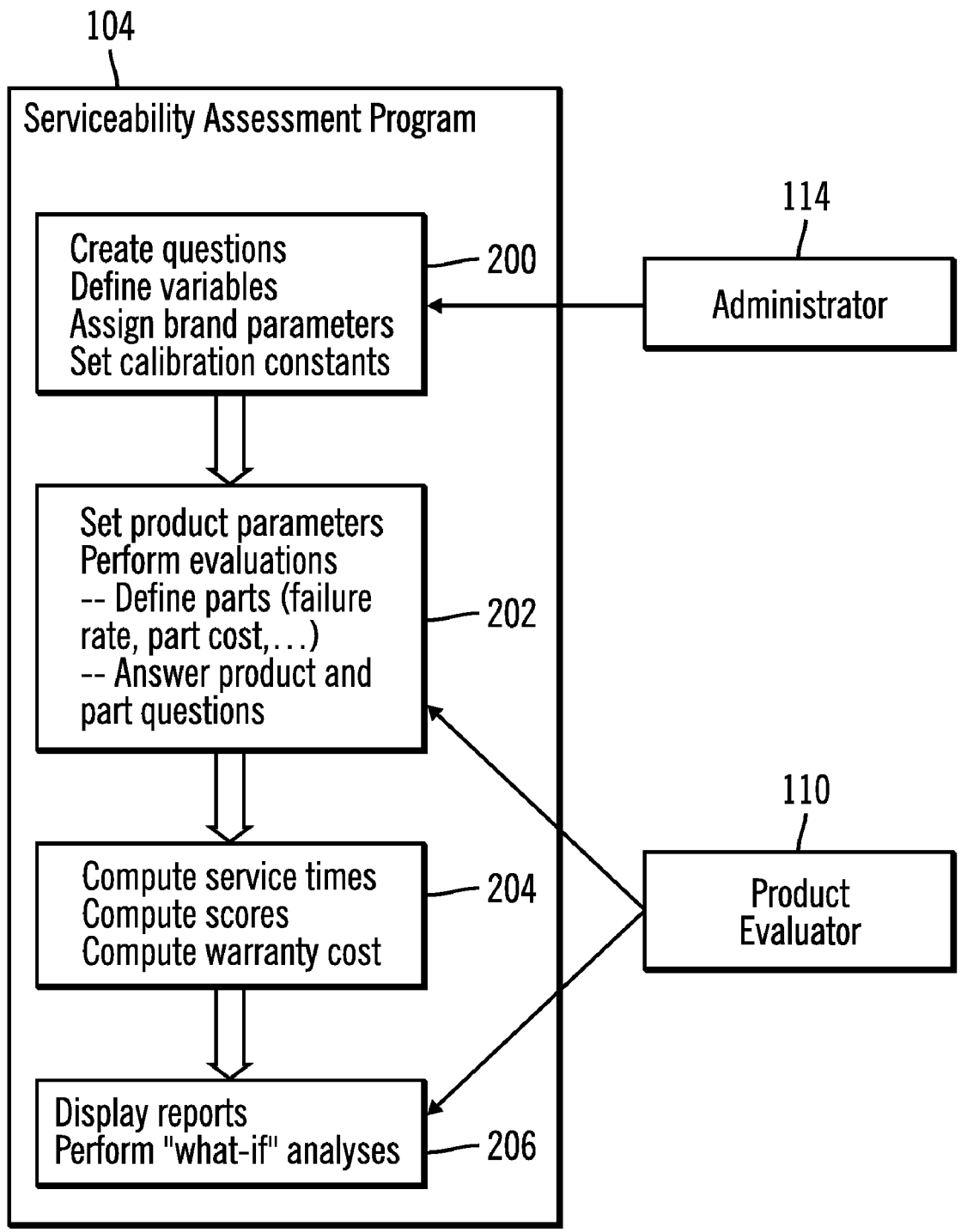
FIG. 2 shows a block diagram of the serviceability assessment program with indications of functions performed by an administrator and a product evaluator, in accordance with certain embodiments.

FIG. 2 shows the serviceability assessment program 104 included in the computational device 102 of FIG. 1, with indications of operations 200 performed by the administrator 114 and indications of operations 202, 204, 206 performed by the product evaluator 110, in accordance with certain embodiments.

The administrator 114 may interact with the serviceability assessment 104 to create questions, define variables, assign brand parameters, and set calibration constants for use by the serviceability assessment program 104, as shown in block 200 of FIG. 2.

The product evaluator 110 may interact with the serviceability assessment program 104 to set (at block 202) product parameters and perform evaluations. For example, the product evaluator 110 may define the failure rate and costs of various parts of a product, and in response to questions from the serviceability assessment program 114 answer questions, such as, questions related to a product and parts of a product.

The product evaluator 110 answers product questions and part questions that may have the following characteristics:
(a) Questions may be presented by the serviceability assessment program 104 in a list for the product evaluator 110 to answer;
(b) A question may be associated with a service category such as component removal and replacement;
(c) A question has a type such as "Yes/No", "Integer", and "Multiple Choice". A "Yes/No" question may be answered either in the affirmative or in the negative. An "Integer" question may accept a response that is an integer. A "Multiple Choice" question may provide many choices as the answer;
(d) A question has a question time value that is based on the answer to the question.
(e) The question time value is added to the service time for the service category of the question;
(f) A question may have a list of subquestions, each of which may have a list of subquestions, and so on to any depth, wherein a subquestion is a new question that may be asked in response to an answer to a question. For example, an exemplary question may be "Is the product a computer?" and if the product evaluator 110 answers in the affirmative, then the exemplary subquestion may be "Is the computer a laptop?";
(g) Questions at each level of the hierarchy may be processed sequentially;
(e) Included in the processing of a question is the sequential processing of the list of subquestions of the question.

The serviceability assessment program 104 computes service time, scores, and warranty costs associated with a product (as shown in block 204), based on answers to questions received from the product evaluator 110. The serviceability assessment program 104 also displays reports and performs "what-if" analysis of various scenarios (as shown in block 206) in response to answers and requests from the product evaluator 110.

Figure 3:
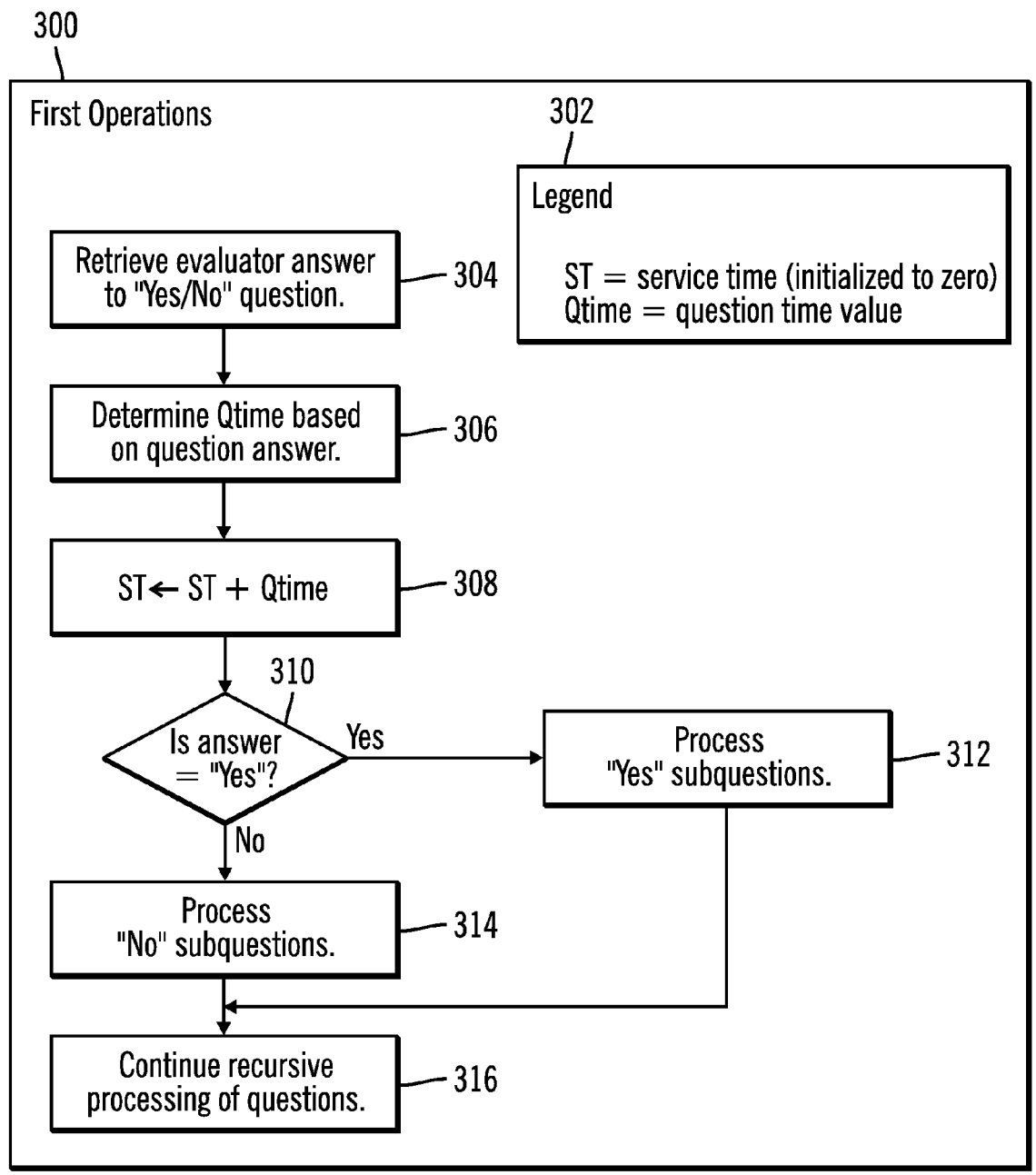
FIG. 3 shows a flowchart that illustrates first operations for computing a service time, wherein the serviceability assessment program receives a response to a "Yes/No" question from a product evaluator, and wherein the response to the "Yes/No" question does not provide indications for the likelihood values associated with each of the two possible responses and does not alter the frequency of subquestions of the "Yes/No" question, in accordance with certain embodiments.

FIG. 3 shows a flowchart that illustrates first operations 300 for computing a service time, wherein the serviceability assessment program 104 receives a response to a "Yes/No" question from a product evaluator 110, and wherein the response to the "Yes/No" question does not provide indications for the likelihood values associated with each of the two possible responses and does not alter the frequency of subquestions of the "Yes/No" question, in accordance with certain embodiments. The legend 302 provides a brief explanation of certain symbols used in the flowchart of FIG. 3. In the flowchart shown in FIG. 3, the symbol "←" indicates that the value of the variable to the left of the symbol is replaced by the value of the expression to its right of the symbol.

Control starts at block 304 in which the serviceability assessment program 104 retrieves the answer of the product evaluator to a "Yes/No" question. The serviceability assessment program 104 determines (at block 306) the Qtime 118 (exemplary Qtime 118 is shown as a data structure in FIG. 1) which is the question time value based on the answer to the "Yes/No" question, and then increases (at block 308) the value of service time, ST, 116 (exemplary ST 116 is shown as a data structure in FIG. 1) by the question time value, Qtime, 118.

Control proceeds to block 310 in which if the answer is "Yes" (indicated as "Y" in the flowchart) then the "Yes" subquestions are processed at block 312, and wherein if the answer is "No" (indicated as "N" in the flowchart) then the "No" subquestions are processed at block 314. Control proceeds to block 316 from block 314, wherein at block 316 the recursive processing of questions and subquestions is continued.

The flowchart of FIG. 3, describes the function of a "Yes/No" question. Note that a "Yes/No" question can have two lists of subquestions, one list of subquestions that applies if the answer to the question is "Yes" and another list of subquestions that applies if the answer to the question is "No", in response to determining at block 310 whether the answer to the question is "Yes".

The "Yes/No" question does not work well for problem determination service methodologies that are sometimes successful and sometimes not successful. For example, consider the question "Does product diagnostic tool X exist?" If the product evaluator 110 prefers to provide a qualified answer, such as, "Yes, but it only isolates the failing part about half the time", then a much better additional question that the serviceability assessment program 104 can ask is "How often does diagnostic tool X isolate the failing part?" Certain embodiments described below includes a "Percent" question that solves this problem.

Figure 4:
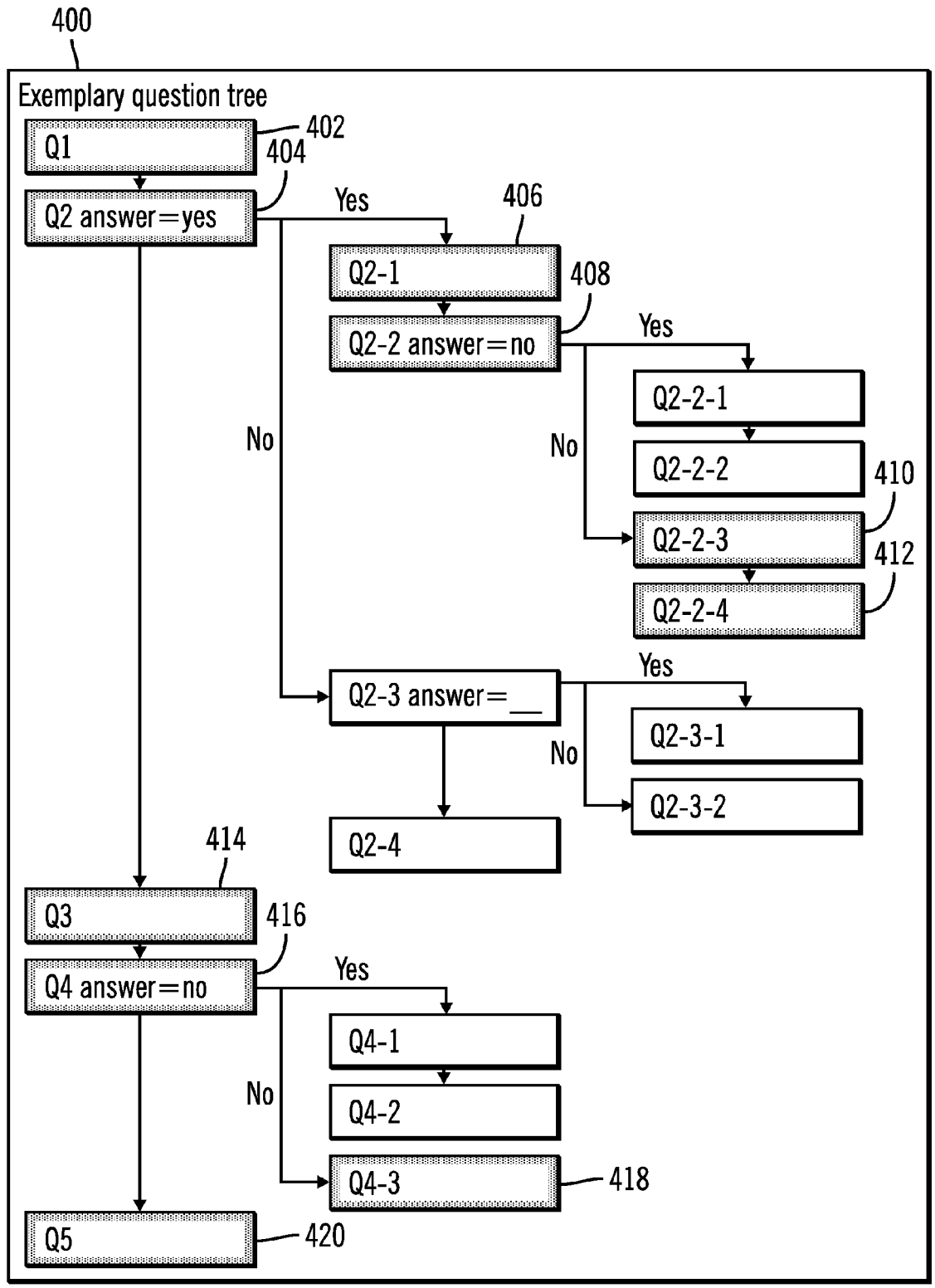
FIG. 4 shows a block diagram that illustrates via a question tree an exemplary selection of questions directed to a product evaluator by the serviceability assessment program, wherein the serviceability assessment program receives responses to questions from the product evaluator, and wherein the responses do not provide indications for the likelihood values associated with each response and do not alter the frequency of the subquestions of questions, in accordance with certain embodiments.

FIG. 4 shows a block diagram that illustrates via an question tree 400 an exemplary selection of questions directed to a product evaluator 110 by the serviceability assessment program 104, wherein the serviceability assessment program 104 receives responses to questions from the product evaluator 110, and wherein the responses to the "Yes/No" questions do not provide indications for the likelihood values associated with each response and do not alter the frequency of the subquestions of the "Yes/No" questions, in accordance with certain embodiments.

In FIG. 4, first an exemplary question Q1 402 is asked by the serviceability assessment program 104 and answered by the product evaluator 110, wherein question Q1 402 may in certain embodiments ask the product evaluator 110 to enter some value, and Q1 402 is not a "Yes/No" question. Then question Q2 404 is asked and answered as "Yes". This is followed by question Q2-1 406, Q2-2 408 (answered as "No"), question Q2-2-3 410, question Q2-2-4 412, question Q3 414, question Q4 (answered as "No") 416, question Q4-3 418, and finally question Q5 420. The total service time is the sum of the question time values for the questions 402, 404, 406, 408, 410, 412, 414, 416, 418 and the service time, ST, 116 is updated at each of the blocks 402, 404, 406, 408, 410, 412, 414, 416, 418. In FIG. 4, the blocks 402, 404, 406, 408, 410, 412, 414, 416, 418 are shaded.

In FIG. 4, problem determination questions are organized in a tree structure where "Yes/No" questions branch to lower levels of the tree as shown. A "Yes/No" question typically asks whether a problem determination diagnostic tool exits for the product or whether particular problem determination information is available. Note that a "Yes/No" question requires the evaluator to give a "binary" answer: Yes" or "No". In the example shown in FIG. 4, the "Yes/No" questions have been answered by the product evaluator 110, resulting in only the questions that are shaded (i.e., questions 402, 404, 406, 408, 410, 412, 414, 416, 418) being presented to the product evaluator 110. The time value of each shaded question 402, 404, 406, 408, 410, 412, 414 is summed to give the total service time.

In FIGS. 3 and 4, for determining the problem determination service times, the time value (Qtime) of each problem determination question is added to its service time category: ST←ST+Qtime. All questions are weighted the same and there is no mechanism to apply a "question frequency" to each question. The operations shown in FIGS. 3 and 4 cannot determine the percentage breakdown of fault isolations into each of the following problem determination (PD) procedures: "automatic PD", "customer PD", "remote support PD (call center)", or "onsite PD".

The method of determining a part's component replacement unit (CRU) status may be based on applying certain threshold criteria to the mechanical operations involved in removing and replacing a part. In certain exemplary embodiments, a product evaluator 110 answers component replacement questions such as "How many captured thumbscrews retain this part?" Answers to these questions determine whether a part qualifies mechanically to be a CRU. It does not take into account problem determination. A customer may often replace a part only if the part can be identified as the failing part without the expense of sending a service engineer onsite. For a part to be "CRUable", the product may have to automatically diagnose itself, or successful problem determination may have to be performed by the customer or by a remote support entity (a call center) with or without customer assistance. FIGS. 3 and 4 do not include any operations for computing the percentage of a part's failures that can only be isolated with onsite problem determination.

Figure 5:
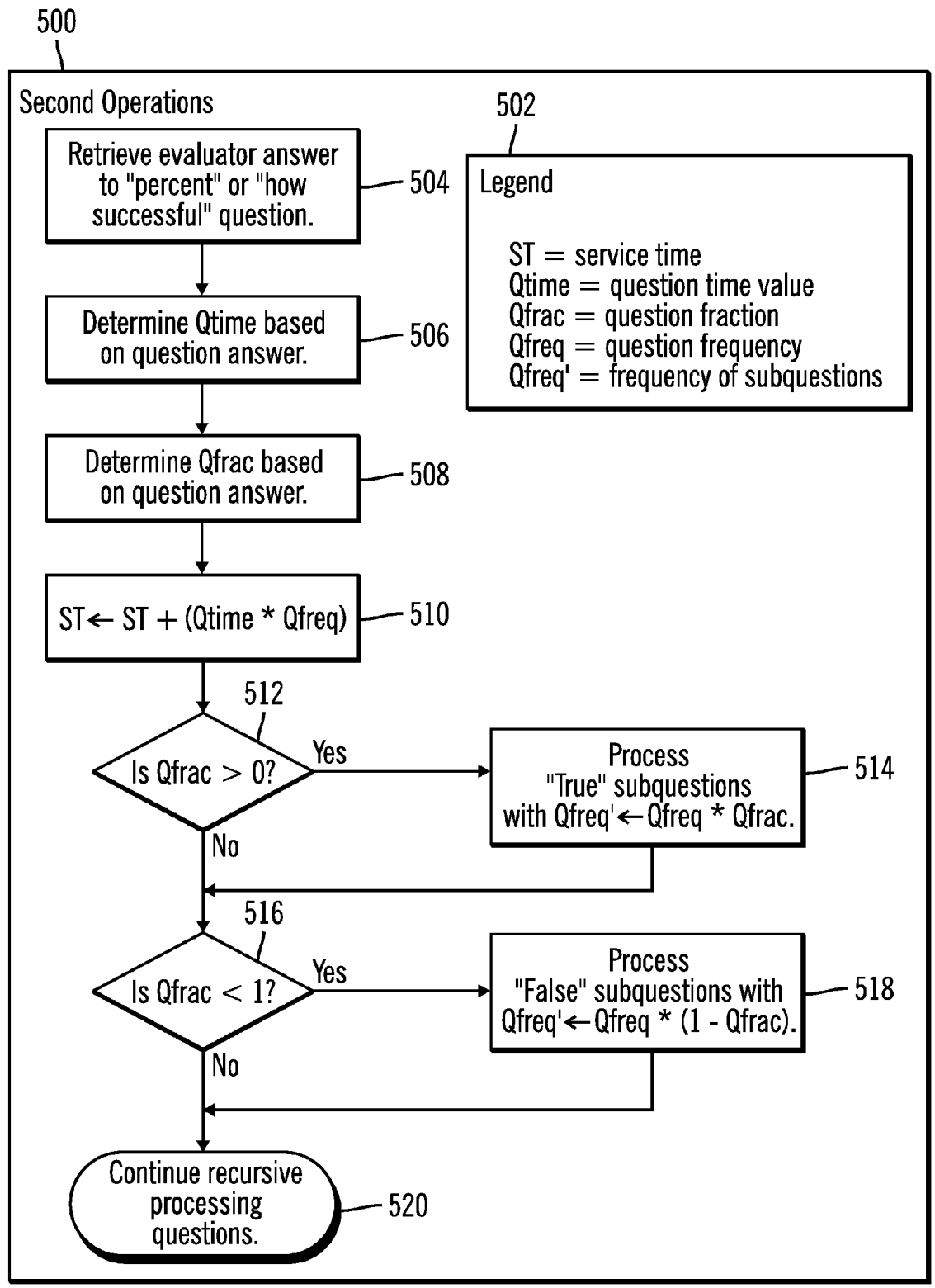
FIG. 5 shows a flowchart that illustrates second operations for computing a service time, wherein the serviceability assessment program receives a response to a "Percent" question from a product evaluator, wherein the response to the "Percent" question provides indications for the likelihood values associated with each response and alters the frequency of the subquestions of the "Percent" question, in accordance with certain embodiments.

FIG. 5 shows a flowchart that illustrates second operations 500 for computing a service time 116, wherein the serviceability assessment program 104 receives a response to a "Percent" question from a product evaluator 110, wherein the response to the "Percent" question provides indications for the likelihood values associated with each response and alters the frequency of the subquestions of the "Percent" question, in accordance with certain embodiments. The legend 502 provides a brief explanation of certain symbols used in the flowchart of FIG. 5.

FIG. 5 shows embodiments that significantly improve upon the mechanism for deriving the serviceability assessment measures described in FIGS. 3 and 4. The improvements are possible because the embodiments include the "Percent" question and the use of a question variable (Qfreq)

122 (shown in FIG. 1) that represents the frequency of the question or the percentage of time that the question applies.

In certain embodiments shown in FIG. 4, the service time increment derived from a question's answer is determined not only by the question time value but also by a variable (Qfreq), which is the fraction of time that the question is applicable. Thus, the problem determination question time value (Qtime) multiplied by its frequency (Qfreq) is added to its service time category: ST←ST+(Qtime*Qfreq).

In certain embodiments, the percentage of fault isolation for each problem determination (PD) procedure can be determined, for example, percentages for "automatic PD", "customer PD", "remote support PD (call center)", and "onsite PD" may be determined.

As noted above, the "Yes/No" question does not work well for problem determination service methodologies that are sometimes successful and sometimes not successful. Certain embodiments allow for a "percent" or "how successful" type of question that may require the product evaluator 110 to answer two lists of subquestions instead of one as with a "Yes/No" question shown in FIGS. 3 and 4. For example, for an exemplary percent question like "How often does diagnostic tool X isolate the failing part?", one list of subquestions would apply when the diagnostic tool X isolates the failing part, and the other list of subquestions would apply when the diagnostic tool does not isolate the failing part.

In a "Percent" question, the answer is mapped to a fraction. The product evaluator 110 can either enter a percent which is mapped to a fraction, or the product evaluator 110 can choose from a discrete list such as {"never", "sometimes", "about half the time", "usually", and "always"} and the selection can be mapped internally to a fraction. In the flowchart of FIG. 5 that shows the "Percent" question, note that here are two additional question variables, Qfrac and Qfreq (and Qfreq' which is the Qfreq of subquestions), that do not exist in FIG. 3.

The problem determination questions may ask if various diagnostic methods exist for the product. A superior methodology is to structure the problem determination questions to correspond to the sequence of problem determination procedures required to isolate a failed part. For example, a product problem determination strategy may use a process comprising of sequentially attempting the following four problem determination procedures until the failure is isolated: "automatic problem determination", "customer problem determination", "remote support problem determination", and "onsite problem determination". With this methodology, the product's problem determination strategy is embedded in the structure of the questions. This can be accomplished by using the "percent" question, as described above.

In FIG. 5 control starts at block 504 in which the serviceability assessment program 104 retrieves the answer of the product evaluator 110 to a "percent" or "how successful" question and then determines (at block 506) Qtime 118, i.e., the question time value, based on the answer to the question. Control proceeds to block 508 in which the serviceability assessment program 104 determines Qfrac 120, i.e., the question fraction, based on the answer to the question, and then determines (at block 510) the service time ST 118 by performing the operation ST←ST+(Qtime*Qfreq).

Control proceed to block 512 in which the serviceability assessment program 104 determines whether the question fraction, Qfrac 120, is greater than zero. If so, the serviceability assessment program 104 processes (at block 514) the "True" subquestions and updates the frequency of subquestions Qfreq' to be Qfreq multiplied by Qfrac as shown in block 514 by the expression Qfreq'←Qfreq*Qfrac). Control proceeds to block 516 for potential processing of the "False" subquestions.

If at block 512 the serviceability assessment program 104 determines that the question fraction, Qfrac 120, is not greater than zero, then, the serviceability assessment program 104 determines (at block 516) whether Qfrac is less than 1. If so, then the serviceability assessment program 104 processes the "False" subquestions and updates the frequency of subquestions Qfreq' to Qfreq'←Qfreq*(1-Qfrac). If at block 516, the serviceability assessment program 104 determines that Qfrac is not less than 1 then control proceeds to block 520 where the recursive processing of questions and subquestions is continued.

Figure 6:
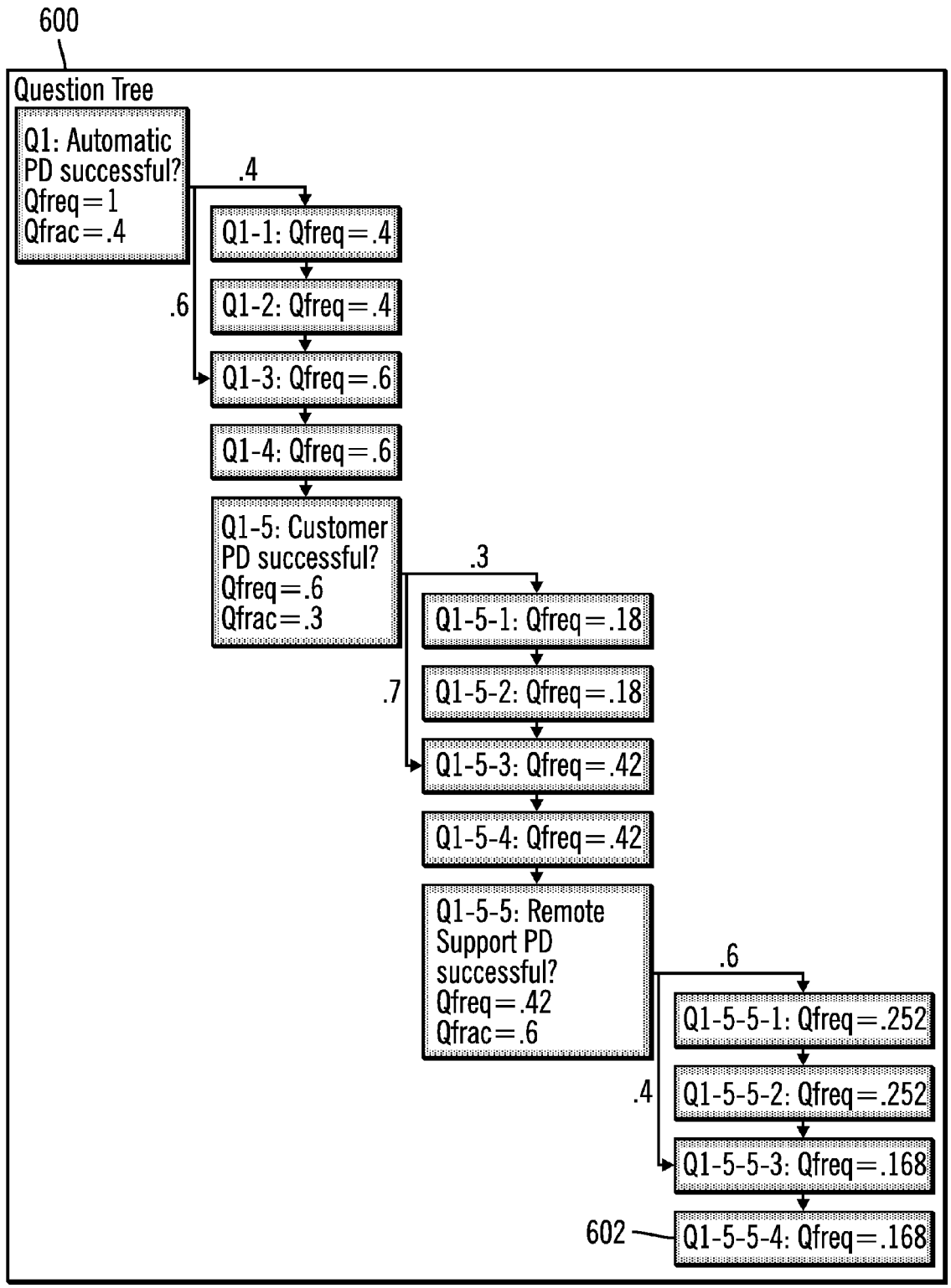
FIG. 6 shows a block diagram that illustrates via a question tree an exemplary selection of questions directed to a product evaluator by the serviceability assessment program, wherein the serviceability assessment program receives responses to "Percent" questions from the product evaluator, wherein the responses to the "Percent" questions provide indications for the likelihood values associated with each response and alters the frequency of the subquestions of the "Percent" questions, in accordance with certain embodiments.

FIG. 6 shows a block diagram that illustrates via a question tree 600 an exemplary selection of questions directed to a product evaluator 110 by the serviceability assessment program 104, wherein the serviceability assessment program 104 receives responses to questions from a product evaluator, wherein the responses to the "Percent" questions provide indications for the likelihood values associated with each response and alters the frequency (or in alternative embodiments weighting) of the subquestions of the "Percent" questions, in accordance with certain embodiments. The likelihood values may in certain exemplary embodiments be provided by percentages.

FIG. 6 shows an example question tree 600 similar to the question tree of FIG. 4, but the questions of FIG. 6 may use "Percent" questions instead of purely "Yes/No" questions. The variables Qfreq and Qfrac have been added to the question blocks. In this example, the "Percent" questions have been answered by the product evaluator 110, and all questions that are in shaded blocks are presented to the evaluator. Because none of the percent questions has an answer of 0% or 100%, all questions are presented and all questions are shaded.

In the example shown in FIG. 6, the part has 16.8% onsite problem determination (as shown in the Qfreq calculated in block 602) in conformity with the execution of the operations illustrated in FIG. 5 resulting in the question tree 600, and if the part were mechanically a CRU, only 83.2% (100−16.8) of its failures would result in a part replacement that the customer might accept as a CRU.

In FIG. 6, the time value (Qtime) of each shaded question is multiplied by its frequency (Qfreq) and is summed to the service time to provide the total service [ST←ST+(Qtime*Qfreq)]. The frequency (Qfreq') of all questions in the list of "True" subquestions under a "Percent" question (with frequency Qfreq and fraction Qfrac) is computed as follows: Qfreq'←Qfreq*Qfrac. The frequency (Qfreq') in all questions in the list of "False" subquestions under a "Percent" question (with frequency Qfreq and fraction Qfrac) is computed as follows: Qfreq'←Qfreq*(1−Qfrac).

Figure 7:
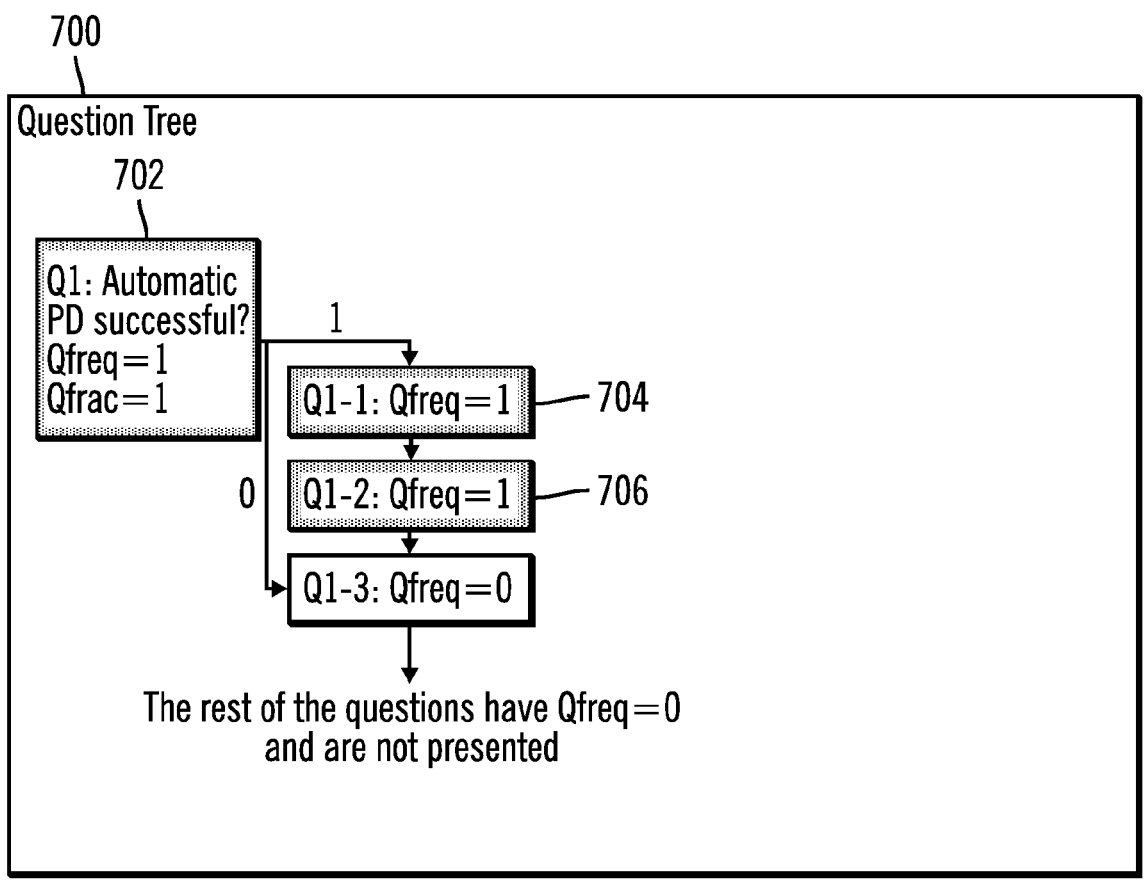
FIG. 7 shows a block diagram that illustrates via a question tree an exemplary selection of questions directed to a product evaluator by the serviceability assessment program, wherein the serviceability assessment program receives responses to questions from the product evaluator, wherein the responses to the "Percent" questions provide indications for the likelihood values associated with each response and alters the frequency of subquestions of the percent questions, in accordance with certain embodiments.

FIG. 7 shows a block diagram that illustrates via a question tree 700 an exemplary selection of questions directed to a product evaluator 110 by the serviceability assessment program 104, wherein the serviceability assessment program 104 receives responses to questions from a product evaluator 110, wherein the responses to the "Percent" questions provide indications for the likelihood values associated with each response and alters the frequency of subquestions of the percent questions, in accordance with certain embodiments.

In the example in FIG. 7, if any of the "percent" questions had a fraction (Qfrac) equal to 0 or 1, then many questions would not be required and so would be not be presented to the product evaluator 110. The example of FIG. 7 has the same question structure as in FIG. 6, but the product evaluator 110 has answered 100% for the first question 702 "How often is automatic PD successful?" Only the three questions 702, 704, 706 that are shaded are presented and contribute to the problem determination service time.

Figure 8:
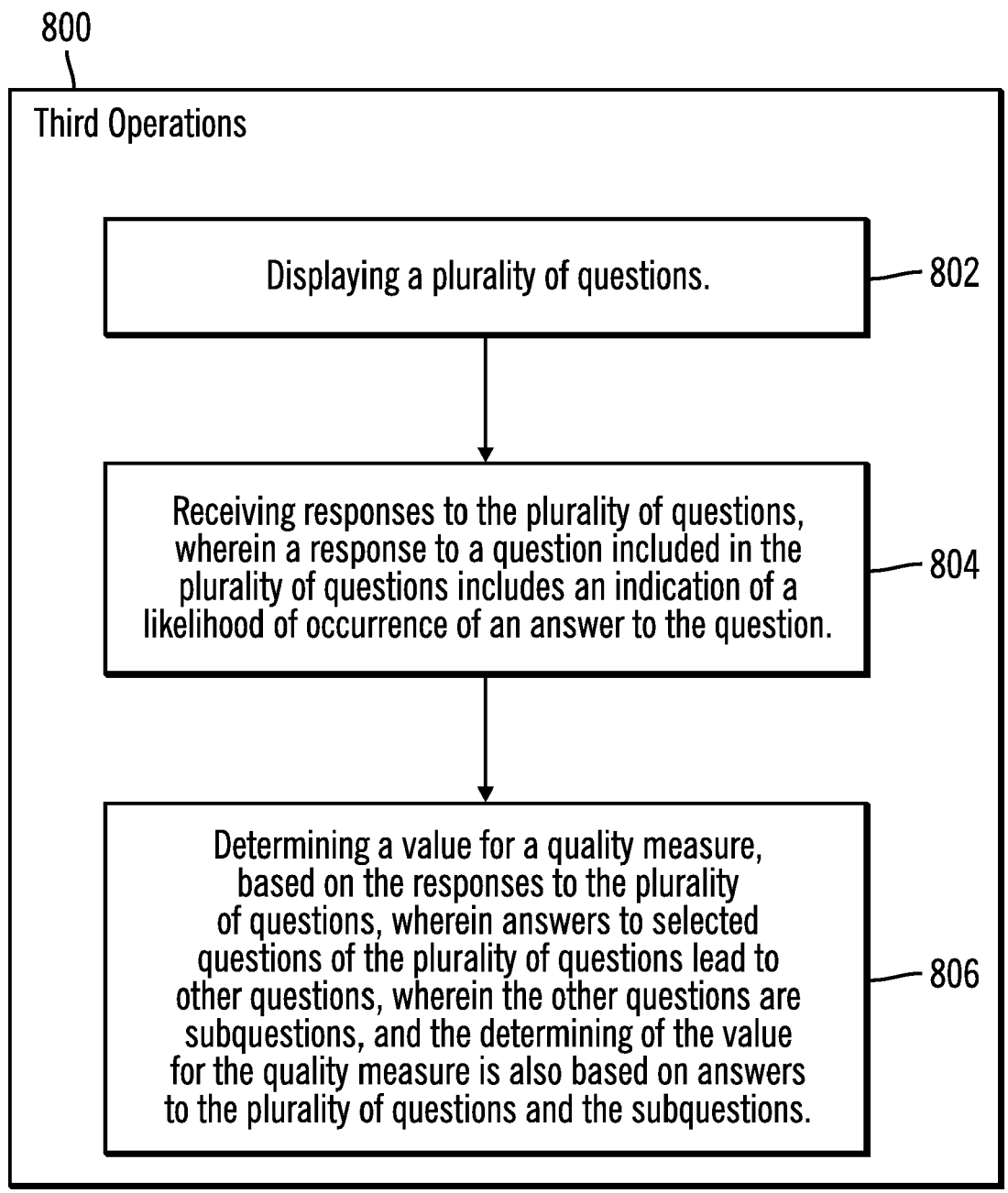
FIG. 8 shows a flowchart that illustrates third operations, in accordance with certain embodiments.

FIG. 8 shows a flowchart that illustrates third operations 800, in accordance with certain embodiments. The third operations may be performed by a serviceability assessment program 104 included in the computational device 102.

Control starts at block 802, in which a plurality of questions are displayed. In certain embodiments, the plurality of questions are configured to evaluate a serviceability of a product, wherein the plurality of questions may be displayed by a serviceability assessment program 104. In certain embodiments, the question is a "Percent" question (also referred to as a percent question) that requests an indication of a likelihood of an occurrence of an answer. Responses to the plurality of questions are received (at block 804) by the serviceability assessment program 104, wherein a response to a question included in the plurality of questions includes an indication of a likelihood of occurrence of an answer to the question. In certain embodiments, the question is a "Percent" question, wherein a response to a "Percent" question includes an indication of a likelihood of occurrence of an answer to the "Percent" question. In certain embodiments, a likelihood of 1 means that the answer is completely in the affirmative and a likelihood of 0 means that the answer is completely in the negative.

A value for a quality measure (such as, a serviceability measure, e.g. service time, ST, 116) is determined (at block 806), based on the responses to the plurality of questions. In certain embodiments, answers to selected questions of the plurality of questions lead to other questions, wherein the other questions are subquestions, and the determining (at block 806) of the value for the quality measure 116 by the serviceability assessment program 104 is also based on answers to the plurality of questions and the subquestions.

In yet additional embodiments, a service time, ST, denotes the serviceability measure that may correspond to the quality measure 116, wherein the serviceability assessment program 104 determines the value of the service time, ST, by calculating the expression ST←ST+(Qtime*Qfreq) [e.g., as shown in block 510 of FIG. 5], wherein Qtime denotes a question time value for a selected question, and wherein Qfreq denotes a fraction of time characterizing the frequency (or weighting) of the selected question.

In further embodiments, paths indicative of likelihoods of answers in the hierarchy of questions are traversed (e.g., as shown in FIG. 6 and FIG. 7), wherein questions in the hierarchy of questions are displayed by the serviceability assessment program 104 in a categorized order, wherein the categories may be based on the type of problem determination, e.g. automatic problem determination, customer problem determination, remote support problem determination, onsite problem determination, etc.

In certain additional embodiments, the serviceability assessment program 104 determines the value of the quality measure, based on answers to the plurality of questions and the subquestions, wherein if Qfreq' denotes a subquestion frequency, Qfreq denotes a question frequency, and Qfrac denotes a question fraction then a frequency of true subquestions is determined by calculating an expression Qfreq'←Qfreq*Qfrac (as shown in block 514 of FIG. 5), and a frequency of false subquestions is determined by calculating an expression Qfreq'←Qfreq*(1−Qfrac) (as shown in block 516 of FIG. 5).

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
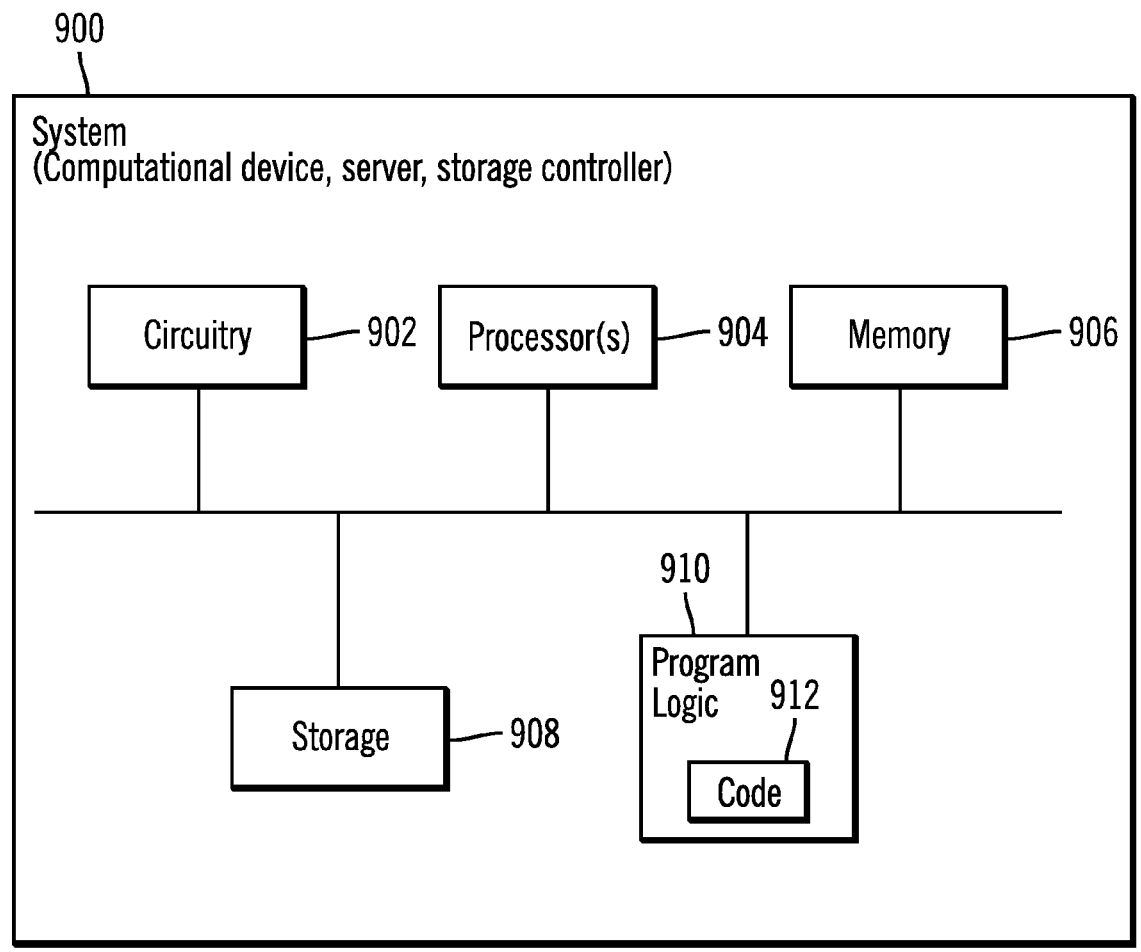
FIG. 9 illustrates a block diagram that shows certain elements that may be included in the computational device in the computing environment of FIG. 1, in accordance with certain embodiments.

FIG. 9 illustrates a block diagram that shows certain elements that may be included in the computational device 102 in accordance with certain embodiments. One or more of the computational devices 102, either individually or collectively may also be referred to as a system 900, and may include a circuitry 902 that may in certain embodiments include a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-9 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
displaying a percent question that requests a product evaluator to indicate how often an event occurs;
in response to receiving a response to the percent question, requesting a first set of responses to a first list of subquestions and a second set of responses to a second list of subquestions, wherein the first list of subquestions is applicable when the event occurs and the second list of subquestions is applicable when the event does not occur, and wherein the response to the percent question represents a fraction;
receiving additional responses to a plurality of additional questions, wherein the percent question, the first list of subquestions, and the second list of subquestions comprise a plurality of questions, and wherein the response to the percent question, the first set of responses, the second set of responses, and the additional responses comprise a plurality of responses; and
determining, via a serviceability assessment program included in a computational device, a service time based on the plurality of responses to the plurality of questions, wherein the service time is determined based on the responses to the plurality of questions and the subquestions, a frequency value denoting a fraction of time when a question is applicable, and a question time value, wherein the service time is determined by adding a previous service time to a product of the question time value for the question and the frequency value, wherein the frequency value is updated based on a question fraction representing the responses to the percent question, a frequency of true subquestions, and a frequency of false subquestions, wherein the frequency of true subquestions is a product of the frequency value and a question fraction, and wherein the frequency of false subquestions is a product of the frequency value and the question fraction subtracted from 1.

2. The method of claim 1, wherein:
the plurality of responses to the plurality of questions are provided by the product evaluator into a display interface generated by the serviceability assessment program; and
a hierarchy of questions includes the plurality of questions, and selected responses to selected questions in the hierarchy of questions are used by the serviceability assessment program to determine the value for the serviceability measure.

3. The method of claim 2, the method further comprising:
traversing paths indicative of likelihoods of answers in the hierarchy of questions, wherein questions in the hierarchy of questions are displayed by the serviceability assessment program in a categorized order.

4. The method of claim 3, wherein the percent question that requests a product evaluator to indicate how often an event occurs comprises asking how often a tool isolates a failing part.

5. A system, comprising:
a memory; and
a processor coupled to the memory, wherein the processor performs operations, the operations comprising:
displaying a percent question that requests a product evaluator to indicate how often an event occurs;
in response to receiving a response to the percent question, requesting a first set of responses to a first list of subquestions and a second set of responses to a second list of subquestions, wherein the first list of subquestions is applicable when the event occurs and the second list of subquestions is applicable when the event does not occur, and wherein the response to the percent question represents a fraction;
receiving additional responses to a plurality of additional questions, wherein the percent question, the first list of subquestions, and the second list of subquestions comprise a plurality of questions, and wherein the response to the percent question, the first set of responses, the second set of responses, and the additional responses comprise a plurality of responses; and
determining, via a serviceability assessment program, a service time based on the plurality of responses to the plurality of questions, wherein the service time is determined based on the responses to the plurality of questions and the subquestions, a frequency value denoting a fraction of time when a question is applicable, and a question time value, wherein the service time is determined by adding a previous service time to a product of the question time value for the question and the frequency value, wherein the frequency value is updated based on a question fraction representing the responses to the percent question, a frequency of true subquestions, and a frequency of false subquestions, wherein the frequency of true subquestions is a product of the frequency value and a question fraction, and wherein the frequency of false subquestions is a product of the frequency value and the question fraction subtracted from 1.

6. The system of claim 5, wherein:
the plurality of responses to the plurality of questions are provided by the product evaluator into a display interface generated by a serviceability assessment program; and
a hierarchy of questions includes the plurality of questions, and selected responses to selected questions in the hierarchy of questions are used by the serviceability assessment program to determine the value for the serviceability measure.

7. The system of claim 6, the operations further comprising:
traversing paths indicative of likelihoods of answers in the hierarchy of questions, wherein questions in the hierarchy of questions are displayed by the serviceability assessment program in a categorized order.

8. The system of claim 7, wherein the percent question that requests a product evaluator to indicate how often an event occurs comprises asking how often a tool isolates a failing part.

9. A hardware implemented computer readable storage medium, wherein code stored in the computer readable storage medium when executed by a processor causes operations, the operations comprising:
displaying a percent question that requests a product evaluator to indicate how often an event occurs;
in response to receiving a response to the percent question, requesting a first set of responses to a first list of subquestions and a second set of responses to a second list of subquestions, wherein the first list of subquestions is applicable when the event occurs and the second list of subquestions is applicable when the event does not occur, and wherein the response to the percent question represents a fraction;
receiving additional responses to a plurality of additional questions, wherein the percent question, the first list of subquestions, and the second list of subquestions comprise a plurality of questions, and wherein the response to the percent question, the first set of responses, the second set of responses, and the additional responses comprise a plurality of responses; and
determining, via a serviceability assessment program, a service time based on the plurality of responses to the plurality of questions, wherein the service time is determined based on the responses to the plurality of questions and the subquestions, a frequency value denoting a fraction of time when a question is applicable, and a question time value, wherein the service time is determined by adding a previous service time to a product of the question time value for the question and the frequency value, wherein the frequency value is updated based on a question fraction representing the responses to the percent question, a frequency of true subquestions, and a frequency of false subquestions, wherein the frequency of true subquestions is a product of the frequency value and a question fraction, and wherein the frequency of false subquestions is a product of the frequency value and the question fraction subtracted from 1.

10. The hardware implemented computer readable storage medium of claim 9, wherein:
the plurality of responses to the plurality of questions are provided by the product evaluator into a display interface generated by a serviceability assessment program; and
a hierarchy of questions includes the plurality of questions, and selected responses to selected questions in the hierarchy of questions are used by the serviceability assessment program to determine the value for the serviceability measure.

11. The hardware implemented computer readable storage medium of claim 10, the operations further comprising:
traversing paths indicative of likelihoods of answers in the hierarchy of questions, wherein questions in the hierarchy of questions are displayed by the serviceability assessment program in a categorized order.

12. The hardware implemented computer readable storage medium of claim 11, wherein the percent question that requests a product evaluator to indicate how often an event occurs comprises asking how often a tool isolates a failing part.

* * * * *